Aug. 23, 1932.  R. HUGERSHOFF  1,873,126
APPARATUS FOR CONTINUOUSLY RECORDING THE PATH OF FLIGHT OF AIRCRAFT
Filed Aug. 30, 1929
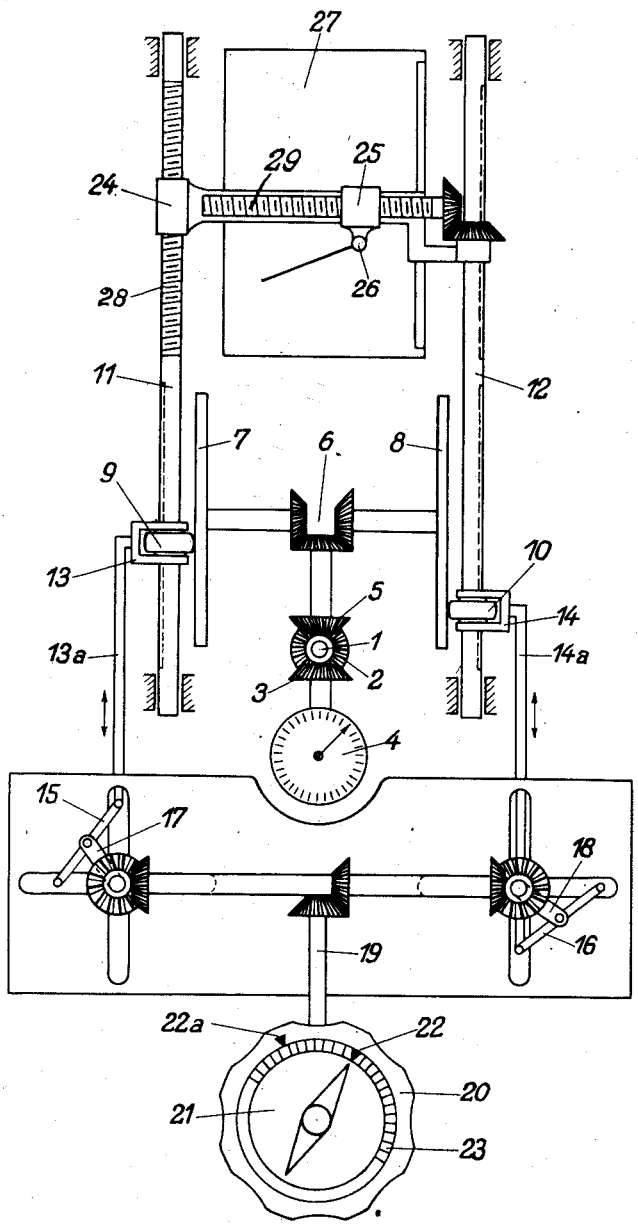
Inventor:
R. Hugershoff Patented Aug. 23, 1932

1,873,126

UNITED STATES PATENT OFFICE

REINHARD HUGERSHOFF, OF DRESDEN, GERMANY, ASSIGNOR TO THE FIRM IKARUS INTERNATIONALE PATENTVERWERTUNGS-AKTIEN-GESELLSCHAFT, OF VADUZ, LIECHTENSTEIN, GERMANY

APPARATUS FOR CONTINUOUSLY RECORDING THE PATH OF FLIGHT OF AIRCRAFT

Application filed August 30, 1929, Serial No. 389,590, and in Germany September 26, 1928.

Devices for the continuous and automatic recording of the path traversed by land vehicles and water craft are known. A corresponding device for aircraft is also possible according to the present invention, by connecting the driving shaft of a known visual speedometer over ground with a cross slide operating the marking stylus, with the interposition of a friction drive. The friction drive enables the speed of revolution of the driving shafts of the two slide elements to be so regulated that one shaft has a velocity of $v_x = v.\sin \alpha$ and the other a velocity of $v_y = v.\cos \alpha$, where $v$, reduced in any desired proportion, is the instantaneous horizontal velocity of the aircraft, and $\alpha$ the azimuth of the instantaneous route direction. The adjusting from time to time of the corresponding velocity components $v_x$ and $v_y$ is effected according to the invention by means of a hand wheel, which is connected with a direction indicator of any convenient kind, such as a magnet, inductive or gyroscopic compass. This hand wheel is always to be so rotated that the direction indicator acts upon a zero mark, which must be adjustable according to the angle of drift between the path of flight and the longitudinal axis of the aircraft, as read off on the visual speedometer.

One constructional example of the invention is illustrated in the accompanying drawing.

A shaft 1 is driven by a motor not shown. The speed of revolution of the shaft 1 is in a known manner so regulated that it is proportional to the speed over ground, which can be read off directly, for instance on a speedometer 4 coupled to the shaft 1 with the interposition of bevel wheels 2 and 3. The shaft 1, by means of the bevel wheels 2 and 5 and a further bevel gear 6, drives friction wheels 7 and 8. From these friction discs 7 and 8 there is imparted to friction pinions 9 and 10, which are mounted upon grooved shafts 11 and 12, a certain speed of revolution, which depends upon the distance of the friction wheels 9 and 10 from the centres of the corresponding friction discs 7 and 8.

The friction wheels 9 and 10, by the aid of shifting forks 13 and 14, can be shifted along the grooved shafts 11 and 12 radially in relation to the friction discs 7 and 8. The displacement is so effected in a known manner by means of crossed-slide controls 15 and 16 that the displacements of the fork rods 13a and 14a are proportional to the sine and cosine respectively of the angle of rotation of driving cranks 17 and 18. These cranks are set in motion by the shaft 19, with the interposition of bevel wheels. The shaft 19 is driven by a hand wheel 20, which is turned through 90 degrees into the plane of the drawing, and the inner portion of which contains a compass 21. To the margin of the compass box is fitted a pointer 22, the position of which is adjustable at will relatively to a pointer 22a. The adjustment required from time to time, which is readable on a circle 23, corresponds to the angle of drift of the aircraft. The grooved shaft 11 terminates in a screw spindle 28, while the grooved shaft 12 drives a horizontal screw spindle 29. By these screw spindles the slide elements 24 and 25 are moved. To the slide element 25 is secured a recording stylus 26, which marks upon a preferably rotatably arranged drawing surface 27 on a unitary scale the route traversed.

Having now described my invention, what I claim as new and desire to secure by Letters Patent is:—

1. Apparatus for continuously recording the path of flight of aircraft, comprising a speedometer shaft revolving at a speed proportionate to the ground speed of the aircraft, a recording stylus, an automatically actuated cross slide system carrying the recording stylus and consisting of two slide elements two friction discs driven by the speedometer driving shaft, and two friction wheels each engaging with one of the friction discs at a variable distance from the centre of the friction disc and each driving one of the slide elements.

2. Apparatus for continuously recording the path of flight of aircraft, comprising a speedometer shaft revolving at proportional speed to the ground speed of the aircraft, a recording stylus, an automatic cross slide system carrying the recording stylus and consisting of two slide elements, two friction discs driven by the speedometer driving shaft, and two friction wheels each engaging with one of the friction discs at a variable distance from the centre of the friction discs and each driving one of the slide elements, means comprising a cross slide control for shifting one of the friction wheels towards and away from the centre of its associated friction disc so that its distance therefrom is proportional to the sine of the direction of travel of the aircraft, means comprising a cross slide control for shifting the other friction wheel towards and away from the centre of its associated friction disc so that its distance therefrom is proportional to the cosine of the direction of travel of the aircraft, a hand wheel for driving the two cross slide controls, a direction indicator having a pointer thereon and having a scale, with an adjustable mark thereon connected with the hand wheel, to which mark the pointer of the direction indicator is kept, the said adjustable mark corresponding to the angle of drift of the aircraft relatively to its longitudinal axis.

3. In an apparatus for continuously recording the path of flight of aircraft, means for measuring the ground speed of aircraft, having a speedometer shaft revolving at proportional speed to that of the aircraft, recording means having a stylus therein for marking the path of flight thereon, automatic means connecting the speedometer shaft with the stylus for actuating the stylus in accordance with the speed of revolution of said shaft, direction means for the aircraft, and means connecting said direction means and the stylus, for actuating the latter in accordance with the angle of drift of the aircraft, whereby the recording means records a path which indicates the actual path of flight with reference to the ground surface.

In testimony whereof I have signed my name to this specification.

REINHARD HUGERSHOFF.